United States Patent
Ott et al.

(10) Patent No.: US 11,552,677 B2
(45) Date of Patent: Jan. 10, 2023

(54) TRANSMITTER FOR POWER LINE COMMUNICATION

(71) Applicant: Melexis Technologies NV, Tessenderlo (BE)

(72) Inventors: Andreas Ott, Erfurt (DE); Federico D'Aniello, Erfurt (DE); Thomas Freitag, Erfurt (DE); Andrea Baschirotto, Tortona (IT)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 17/496,486

(22) Filed: Oct. 7, 2021

(65) Prior Publication Data
US 2022/0116075 A1   Apr. 14, 2022

(30) Foreign Application Priority Data
Oct. 8, 2020   (EP) .................................... 20200784

(51) Int. Cl.
*H04B 3/54*   (2006.01)
(52) U.S. Cl.
CPC .................................... *H04B 3/548* (2013.01)
(58) Field of Classification Search
None
See application file for complete search history.

(56) References Cited

U.S. PATENT DOCUMENTS

| | | | | |
|---|---|---|---|---|
| 4,166,470 A * | 9/1979 | Neumann | ............. | A61B 5/0031 607/33 |
| 4,172,459 A * | 10/1979 | Hepp | .................... | A61B 5/7203 600/510 |
| 4,187,854 A * | 2/1980 | Hepp | .................... | A61B 5/0031 607/33 |
| 6,577,230 B1 * | 6/2003 | Wendt | ...................... | H04B 3/56 375/258 |
| 8,049,599 B2 * | 11/2011 | Sutardja | ................. | H05B 47/18 315/72 |
| 8,164,428 B2 * | 4/2012 | Sutardja | ............... | H05B 39/044 315/72 |

(Continued)

FOREIGN PATENT DOCUMENTS

| CN | 1941017 A | * | 4/2007 | ............... H04B 3/54 |
|---|---|---|---|---|
| CN | 102025155 A | * | 4/2011 | |

(Continued)

OTHER PUBLICATIONS

"IEEE Approved Draft Standard for DC Power Transmission and Communication to DC Loads," in IEEE P2847/D4, Sep. 2021, vol. no., pp. 1-92, Nov. 10, 2021. (Year: 2021).*

(Continued)

*Primary Examiner* — Berhanu Tadese
(74) *Attorney, Agent, or Firm* — Workman Nydegger

(57) ABSTRACT

A transmitter device is provided for transmission of data via DC power distribution lines includes a sequence generator arranged for receiving a raw data bit stream to be transmitted over a positive and a negative DC power distribution line and for deriving a switching sequence based on the raw data bit stream, and a circuit including one or more capacitors and a plurality of switches controllable with the switching sequence derived in the sequence generator.

13 Claims, 6 Drawing Sheets

(56) References Cited

U.S. PATENT DOCUMENTS

| | | | | |
|---|---|---|---|---|
| 9,509,456 | B2 * | 11/2016 | Ott | H04J 13/00 |
| 9,627,898 | B2 * | 4/2017 | Beaury | H04L 12/40045 |
| 10,298,292 | B2 * | 5/2019 | Choi | H05B 47/185 |
| 10,862,537 | B2 * | 12/2020 | Yano | H04B 3/54 |
| 2012/0033744 | A1 * | 2/2012 | Ovchinnikov | H04B 3/548 |
| | | | | 375/257 |
| 2014/0341235 | A1 * | 11/2014 | Tagashira | H04B 3/542 |
| | | | | 370/479 |
| 2017/0111086 | A1 * | 4/2017 | Choi | H05B 47/185 |
| 2018/0337555 | A1 * | 11/2018 | Braginsky | H04B 3/546 |
| 2019/0089411 | A1 * | 3/2019 | Olmstead | H04B 3/548 |
| 2020/0127702 | A1 * | 4/2020 | Ding | H04B 3/54 |
| 2020/0304172 | A1 * | 9/2020 | Yano | B60R 16/023 |
| 2022/0116075 | A1 * | 4/2022 | Ott | H04B 3/548 |

FOREIGN PATENT DOCUMENTS

| | | | | |
|---|---|---|---|---|
| CN | 103236712 A | * | 8/2013 | |
| CN | 103365226 A | * | 10/2013 | H02J 7/0042 |
| CN | 104115415 A | * | 10/2014 | H04B 1/707 |
| CN | 204205591 U | * | 3/2015 | |
| CN | 204230892 U | * | 3/2015 | |
| CN | 204230893 U | * | 3/2015 | |
| CN | 204230927 U | * | 3/2015 | |
| CN | 204230936 U | * | 3/2015 | |
| CN | 104485656 A | * | 4/2015 | H02J 1/00 |
| CN | 104485695 A | * | 4/2015 | |
| CN | 204349469 U | * | 5/2015 | |
| CN | 105900157 A | * | 8/2016 | G08C 19/02 |
| CN | 107085169 A | * | 8/2017 | |
| CN | 103365226 B | * | 4/2018 | H02J 7/0042 |
| CN | 107968393 A | * | 4/2018 | H02H 9/005 |
| CN | 107994552 A | * | 5/2018 | H02H 3/006 |
| CN | 108258662 A | * | 7/2018 | |
| CN | 108663602 A | * | 10/2018 | G01R 31/086 |
| CN | 109412406 A | * | 3/2019 | H02M 3/07 |
| CN | 109525282 A | * | 3/2019 | H04B 3/54 |
| CN | 109525284 A | * | 3/2019 | H04B 3/54 |
| CN | 108663602 B | * | 7/2019 | G01R 31/086 |
| CN | 109995016 A | * | 7/2019 | |
| CN | 110018400 A | * | 7/2019 | G01R 31/085 |
| CN | 107994552 B | * | 8/2019 | H02H 3/006 |
| CN | 110474317 A | * | 11/2019 | |
| CN | 209805431 U | * | 12/2019 | |
| CN | 110927520 A | * | 3/2020 | G01R 31/085 |
| CN | 110995030 A | * | 4/2020 | H02J 1/00 |
| CN | 111342483 A | * | 6/2020 | |
| CN | 105900157 B | * | 10/2020 | G08C 19/02 |
| CN | 109412406 B | * | 11/2020 | H02M 3/07 |
| CN | 112242857 A | * | 1/2021 | G08C 19/02 |
| CN | 109525284 B | * | 5/2021 | H04B 3/54 |
| CN | 109525282 B | * | 6/2021 | H04B 3/54 |
| CN | 112242857 B | * | 12/2021 | G08C 19/02 |
| CN | 114401028 A | * | 4/2022 | H04B 3/548 |
| DE | 102012205802 A1 | * | 10/2013 | H02J 7/0042 |
| EP | 1017196 A2 | * | 7/2000 | H04L 5/20 |
| EP | 1017196 B1 | | 3/2007 | |
| EP | 2651043 A1 | * | 10/2013 | H02J 7/0042 |
| EP | 2903172 A1 | * | 8/2015 | H04B 3/54 |
| EP | 3035551 A1 | * | 6/2016 | H04B 3/54 |
| EP | 2903172 B1 | * | 11/2016 | H04B 3/54 |
| EP | 3163550 A1 | * | 5/2017 | G08C 19/02 |
| EP | 2651043 B1 | * | 10/2017 | H02J 7/0042 |
| EP | 3163550 A4 | * | 12/2017 | G08C 19/02 |
| EP | 3163550 B1 | * | 1/2019 | G08C 19/02 |
| EP | 3035551 B1 | * | 8/2019 | H04B 3/54 |
| EP | 3982513 A1 | * | 4/2022 | H04B 3/548 |
| ES | 2716378 T3 | | 6/2019 | G08C 19/02 |
| JP | 5234212 B1 | * | 7/2013 | H04B 1/707 |
| JP | 2013220015 A | * | 10/2013 | H02J 7/0042 |
| JP | 2014039178 A | * | 2/2014 | H04B 1/707 |
| JP | 2014064450 A | * | 4/2014 | |
| JP | 6157183 B2 | * | 7/2017 | H02J 7/0042 |
| JP | 6259126 B2 | * | 1/2018 | G08C 19/02 |
| KR | 2069596 B1 | * | 2/2020 | G08C 19/02 |
| WO | WO-2008079399 A2 | * | 7/2008 | H05B 37/02 |
| WO | WO-2016003090 A1 | * | 1/2016 | G08C 19/02 |
| WO | WO-2018079905 A1 | * | 5/2018 | H02M 1/32 |
| WO | WO-2020127702 A1 | * | 6/2020 | B64C 13/18 |

OTHER PUBLICATIONS

"IEEE Draft Standard for DC Power Transmission and Communication to DC Loads," in P2847/D2, May 2021, vol. no., pp. 1-87, Jun. 23, 2021. (Year: 2021).*

Extended Search Report from corresponding EP Application No. 20200784.5, dated Mar. 2, 2021.

* cited by examiner

TRANSMITTER FOR POWER LINE COMMUNICATION

FIELD OF THE INVENTION

The present invention is generally related to the field of communication devices for power line communication.

BACKGROUND OF THE INVENTION

In recent years the number of electrical elements connected via a wire-line network has rapidly grown, especially in automotive industrial environments. High speed connections offering bit rates above 1 Mbps via differential bus systems such as Controller Area Networks (CAN), are broadly used. Apart from the speed also a low latency between reception and acknowledgement of messages are key features to allow for coping with an increasing number of nodes participating in the network.

The power supply of the network nodes is mostly taken from a separate wiring assembly which is economically and environmentally inefficient. The fact that the power supply harness is spectrally different from the network connection, motivates to merge them. Such a system is called a PLC (Power Line Communication) system, wherein the communication is performed via the power supply connection lines. Merging both functions, i.e. network node power supply and communication, offers the advantage that e.g. in a CAN network two wires can be saved. Hence, a gain in cost can be achieved.

Most of the available solutions today are based on a carrier modulation. The modulation scheme however introduces latency in the communication because the carrier recovery and signal processing to extract the message data is time-consuming. Hence, even apart from the cost of the numerous components required in such solution, a carrier based system is clearly not capable of addressing high speed and low latency demands.

Such high speed and low latency demands may be needed for example in automotive interior light applications. A high number of network nodes, in that case lighting nodes, with for instance 20 . . . 200 members, can form a lighting unit (e.g. a light stripe or lighting surface) able to display also information for the driver. Such information is e.g. welcome information displayed when opening the car, whereby the different network nodes are individually addressed to emit light of different colours and intensities. Such a lighting unit might also display a warning information, e.g. if another car is detected by radar sensors in the door to be in the blind spot of the mirror. In external automotive lighting applications, a tail light might form a display, which can indicate to other cars, bicycles or pedestrians, the driver is about to open the car door for example. In all these applications any flickering or delayed response of one or more network nodes must be avoided as the human eye is very sensitive to that.

In these applications it is very common that the power supply of the network nodes is provided from one and the same harness.

In order to improve the performance in terms of achievable network speed and latency baseband communication systems have been proposed. In such systems the data is applied directly to the power supply without a carrier. The data signal is applied by pulses during the dominant levels (representing the low level of the data signal in case of a CAN bus). Advantages of a baseband system are higher bit rates compared to signal carrier methods using high frequencies.

U.S. Pat. No. 6,577,230 B1 discloses a network with at least two lines and network users. The lines are used both for data transmission among users and for power transmission from a voltage source to the network users. The data is transmitted symmetrically and differentially via the two lines. One terminal of the voltage source is coupled to both lines. The network users are coupled to the other voltage source terminal via an electrical connection separated from the network. The users symmetrically couple the transmitted power from both lines of the network. The two lines are isolated from each other. The users may use inductive or capacitive coupling of data, and use inductors to couple the power. The proposed network can for example be applied in a motor vehicle and in domestic appliances.

EP1017196 B1 relates to transferring digital data using differential and common mode data signalling. A first digital data signal is differentially transmitted using two differential signal components sent over a two-wire interface and switched between several different discrete signal levels. A common mode signal is carried across the differential pair and used to transmit a second digital data signal. The data output stage uses a common mode injection circuit to inject a common mode voltage or current equally onto both components of the differential interface. The data receiver has a common mode extraction circuit connected to the differential interface which extracts the injected common mode signal. Common mode data transmission can be in the same or opposite direction as the differential data transmission. Common mode signals may be injected in several layers and across two or more differential interfaces to increase the data content per interface line and to improve accuracy.

The recent application US2020/127702 A1 describes a first device that provides both power and data to a second device over a power line connection between the two devices. The first device includes a power line extending from a power supply, a ground line extending from a ground, a first impedance in the power line, and a second impedance in the ground line. A modulator comprised of a transistor and modulator impedance is between the first impedance and the second impedance, and a tank capacitor is between the power line and the ground line, outside the first impedance and second impedance. A comparator is coupled between the first and second impedance. A switch may be included to short out the first and second impedance, thereby enabling transmission of only power for period of time, and return to a mode of transmitting both data and power. The first device may also receive data from the second device over the power line connection.

There may, however, be a need for alternative implementations of a baseband power line communication system.

SUMMARY OF THE INVENTION

It is an object of embodiments of the present invention to provide for a baseband transmitter for data transport over DC power distribution lines, that forms an alternative to existing solutions. It is a further object to provide a communication system wherein such a transmitter is applied.

The above objective is accomplished by the solution according to the present invention.

In a first aspect the invention relates to a transmitter device for transmission of data via DC power distribution lines, said transmitter device comprising:

a sequence generator arranged for receiving a raw data bit stream to be transmitted over a positive and a negative DC power distribution line and for deriving a switching sequence based on said raw data bit stream, a circuit comprising one or more capacitors and a plurality of switches controllable with said switching sequence derived in said sequence generator, said one or more capacitors being connectable to said positive and negative DC power distribution lines via said plurality of switches, wherein said circuit is arranged for injecting in said positive and negative DC power distribution lines symmetric displacement currents resulting from displacing charges on said one or more capacitors when said one or more capacitors are charged or discharged according to the sequence of switching, said symmetric displacement currents giving rise to changes in voltage of a same magnitude and opposite polarity on said positive and negative DC power distribution lines, said voltage having a same frequency as said raw data bit stream.

The proposed solution indeed allows for a baseband implementation of the communication system. The architecture allows differential signalling to be applied, which offers the advantage of reduced electromagnetic emissions. Further, such architecture offers the benefit of being robust against electromagnetic disturbances. The fact that power distribution functionality and communication functionality make use of the same physical wires yields a cost advantage compared to a scenario wherein these functions are not merged. The operation of the transmitter device is based on symmetric displacement currents that occur when charges on the capacitor(s) displace when charging or discharging. Note that symmetric is to be construed as substantially symmetric, i.e. symmetric within manufacturing or design tolerances.

In a preferred embodiment the switches form an H-bridge with one capacitor connecting the two legs of the H-bridge.

In another preferred embodiment the switches form an H-bridge whereby between the two legs of the H-bridge an in series connection of two capacitors is realized having an interconnection point connected to a resistive divider forming a virtual ground in said interconnection point.

In a further preferred embodiment the circuit forms a H-bridge wherein the connection between the two legs of the H-bridge comprises a switch of the plurality of switches and wherein each leg of the H-bridge comprises a further switch of said plurality and a capacitor of the one or more capacitors.

In embodiments of the invention the sequence generator is arranged to receive an enable signal to enable transmission by the transmitter device.

Advantageously the sequence generator comprises a memory to store information related to a charging state corresponding to the sequence of switching.

The sequence generator preferably comprises a timer arranged to send timing signals to open or close one or more switches of the plurality of switches.

In some embodiments the switching sequence is adapted to perform a preconditioning of charge stored on at least one of the one or more capacitors.

Advantageously, the switching sequence is adapted to perform a precharging cycle of at least one of the one or more capacitors before transmission is started.

In another embodiment the transmitter device comprises a receiver block arranged to receive data, so that the transmitter device also has receiver functionality. In other words, the device can then operate as a transceiver.

In preferred embodiments the transmitter device as previously described is implemented in a vehicle.

In another aspect the invention relates to a system for transmission of data, comprising a positive and a negative DC power distribution line, a power supply feed connected to said positive and a negative DC power distribution line, a termination impedance, one or more network nodes connected to the positive and a negative DC power distribution line, each network node comprising a transmitter device as previously described.

In some embodiments the data to be transmitted via said transmitter device comprises one or more CAN (Controller Area Network) or LIN (Local Interconnect Network) or Ethernet data frames.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
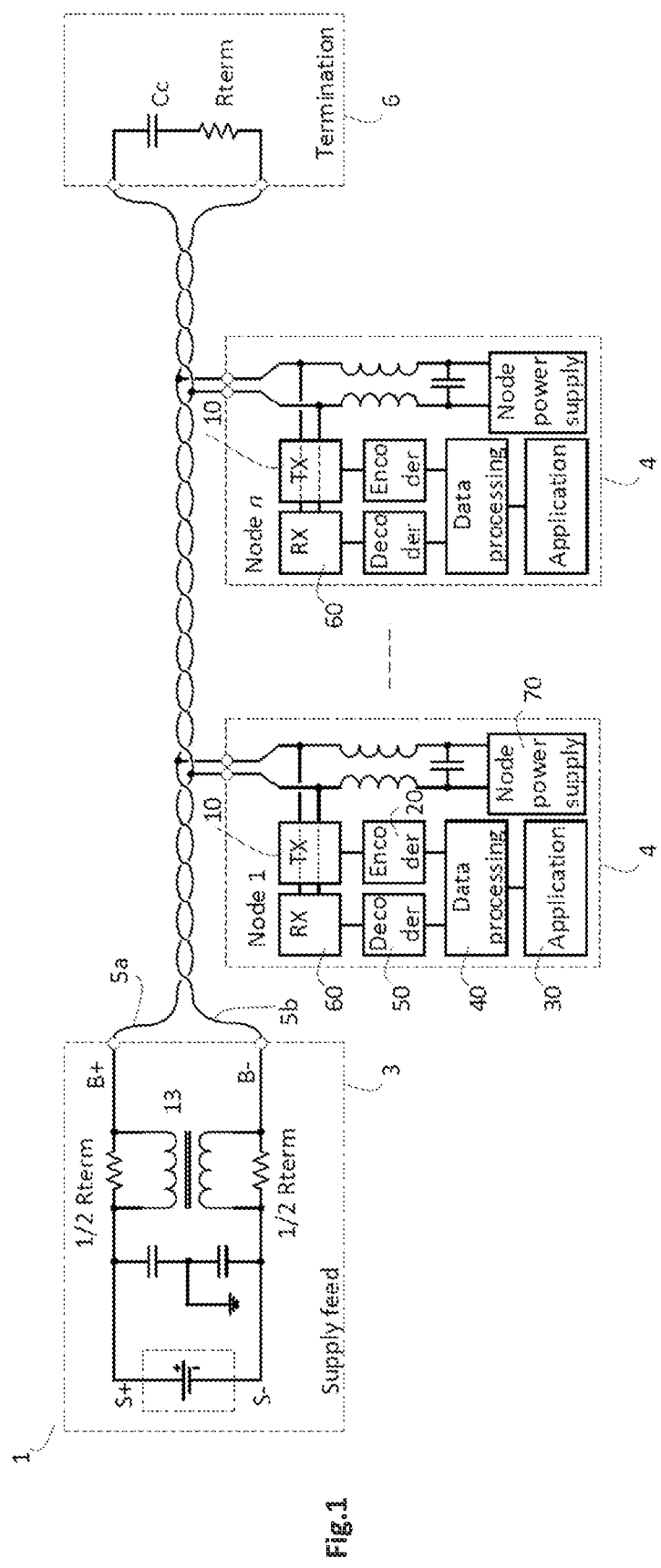
FIG. 1 illustrates an embodiment of a Power Line Communication system as in the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to a baseband power line communication (PLC) system and in particular to a transmitter device for data transmission in such a baseband PLC system.

FIG. 1 represents a scheme of an embodiment of a PLC system (1) wherein the device according to this invention is used. The illustrated system comprises a DC power supply feed (3) for supplying the network nodes that are part of the system, at least two of the network nodes (4) being suited to operate on a certain field of application, a communication bus comprising two conductors B+ (5a) and B- (5b) and a network termination impedance (6) at the end of the bus. At least one and preferably all of the network nodes comprise a transmitter device (10) according to the invention. In a preferred embodiment the communication bus is implemented with twisted pair cable, although this is not mandatory. For example, in some applications the use of coaxial cable can be envisaged. Thus, the example system architecture of FIG. 1 contains a plurality of network nodes able to obtain power supply from the communication bus lines and to communicate over the network via said bus lines.

The power supply feed (3) in FIG. 1 comprises a DC supply instance with a positive terminal S+ and a negative terminal S-. In advantageous embodiments of the PLC system the DC supply is simply a battery. Alternatively, any other DC power supply as known in the art can be applied, which provides a low internal resistance at close to zero frequencies and at low frequencies. The value of the internal resistance and the frequency band where this low resistance is found, depends heavily on the envisaged application (i.e. on the current and power dissipation of the connected nodes). The power supply must fit into the application and the internal resistance must be sufficiently low to ensure a stable supply for the network nodes. Further an inductive feed (13) is connected between the power supply terminals S+, S- and the communication bus lines (5a, 5b) carrying voltage signals B+ and B-, respectively, in order to raise the impedance in the higher frequencies or frequency bands where the communication is located spectrally, for example the frequency range above 200 kHz. In a communication network wherein the physical layer is symmetrical, such as in a CAN bus, the network lines are symmetrically placed, e.g. in a twisted pair arrangement. This means that mechanical, electrical and magnetic properties are substantially identical for or between the two wires. Applying differential signalling offers the benefit of lower electromagnetic emissions because the sum of the current flowing into the network node is zero while between the symmetric lines there are no big radiation loops which could act as antenna. This is supported by arranging the network cables as e.g. a twisted pair.

The inductive feed is advantageously implemented as a common mode choke as shown in the embodiment of FIG. 1. This common mode choke helps to suppress common mode signals and unwanted interferences coupled into the network from disturbers like e.g. electrical motors. Alternatively the inductive feed can be implemented with single inductors or as simulated inductances generated by a gyrator and a capacitance, as known in the art.

The power supply feed matches in the frequency band used for communication of the data signal the line characteristic line impedance of the power lines, which is in case of e.g. twisted pair cable typically between 100 and 150 Ohm, e.g. 120 Ohm. Since a line impedance match is only required for the communication band, the termination resistor $R_{term}$ can be AC coupled by a capacitor Cc as depicted for the bus termination circuit element in FIG. 1. This provides an almost infinite impedance at DC and the nominal termination impedance in the frequency range of the communication band. The AC coupled termination impedance can also be applied to the power supply feed circuit. In the example PLC scheme of FIG. 1, the termination at the power supply feed is accomplished by splitting the termination resistance $R_{term}$ in two halves and applying the two halve termination resistances in parallel to the inductive feed, here the common mode choke, which places them symmetrically in series to the DC power supply. In this case no AC coupling is needed since there is no DC current flow induced by the termination resistor as such. In parallel to the power supply terminals S+, S− a decoupling capacitor may be provided in addition (as in the scheme of FIG. 1) to provide a low impedance at the data communication frequency band. This decoupling capacitor can be split in two separate capacitors connected to a common ground as illustrated in FIG. 1.

FIG. 1 also illustrates the already mentioned advantage that separate power distribution lines (positive and negative supply) and separate communication lines (e.g. CANH (CAN high) and CANL (CAN low)) can be merged to only two wires, which clearly yields a cost advantage compared to wired network solutions as known in the art where these two functionalities are not merged.

An application wherein the scheme of FIG. 1 can be used, is for example a light emitting device comprising one or more light emitting diodes (LEDs) of different colours as already previously described. Alternatively it can for instance be an actuator in a series of actuators in a climate control system of a vehicle, whereby each actuator drives a flap in order to regulate the air stream at different locations in the vehicle.

It is noted that in the scheme of FIG. 1 the transmitter device of the invention is actually shown as a transceiver, i.e. as a device with not only capabilities for transmission but also for receiving data. In other embodiments, however, the device of the invention has only transmit capabilities. The transmitter device or the transmitter/receiver device are part of a network node as shown for the transceiver in FIG. 1. The transmitter and receiver, if present, may in some embodiments be integrated in a single device and in other embodiments be implemented as separate devices.

In embodiments of the system of this invention the data processing block (40) running in the network node is arranged to receive from the communication bus, via the receiver block (60), information to control the application. Such information may for instance be address information for the node to be addressed or e.g. colour and intensity information for a lighting application. The data processing device is further arranged to transmit via the transmitter device (10) information to the bus. Such information may for instance be monitoring information of an application status. One example may be position information of e.g. a climate flap in a climate control system. The data processing block (40) may comprise e.g. a central processing unit (CPU), a program memory as e.g. a Flash or a ROM memory, data memories as e.g. RAM and EEPROM, all arranged to process information.

The receiver block (60) in the transceiver device transfers data received from the communication bus to a decoding unit (50), which decodes the received information according to a decoding scheme and provides this information to the data processing device (40).

In the opposite direction the data processing device in the network node provides data to an encoder (20), which encodes the data according to an encoding scheme. The encoder sends the encoded data (further referred as raw data) to the transmitter (10) that will put the data on the communication bus. This functionality is obviously also provided for in a device adapted to operate as a transmitter only.

The node power supply block (70) in FIG. 1 provides a power supply to the different blocks of the network node (4). The block (70) generates the power supply out of the power received through the power distribution lines (5a,5b) via a decoupling network.

As previously said, the positive and negative supply lines provide power to the different network nodes (4) but also serve as data lines for a differential network.

Figure 2:
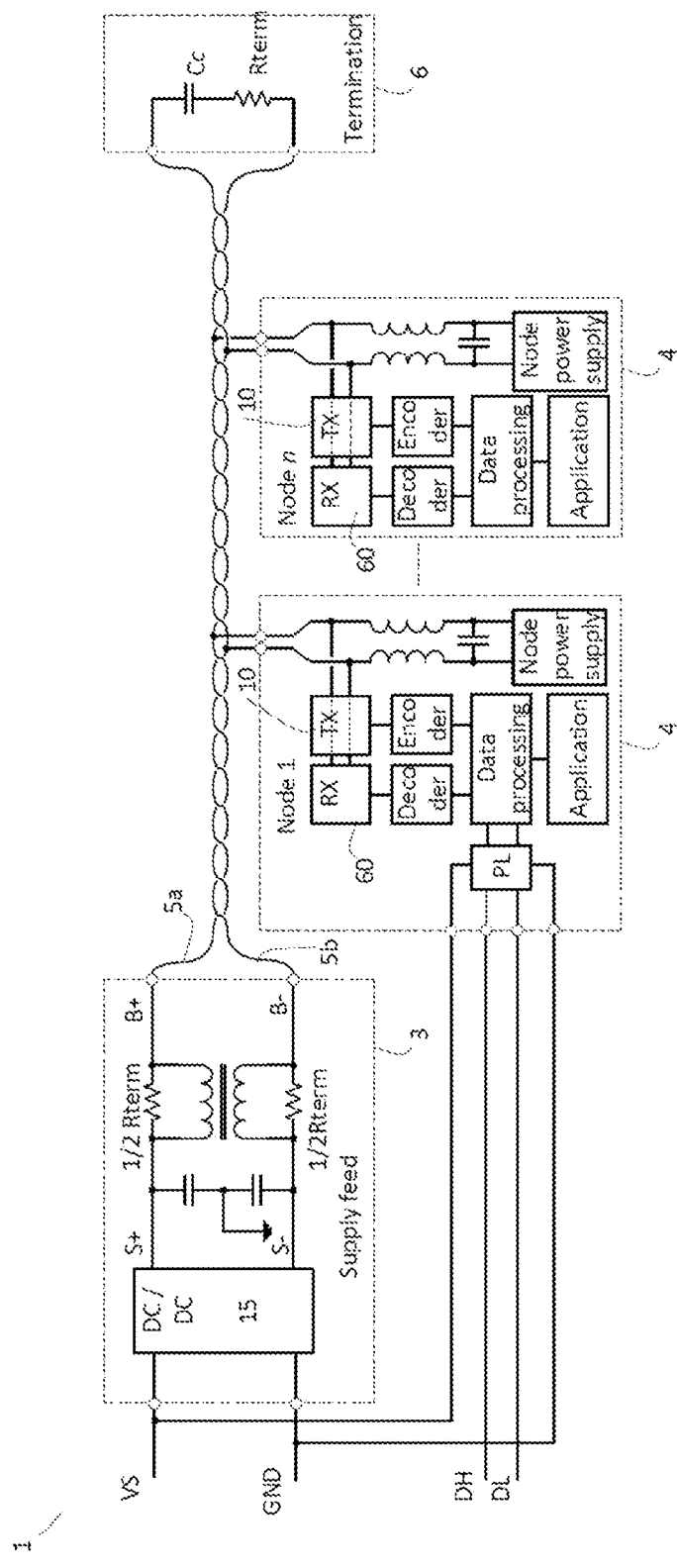
FIG. 2 illustrates another embodiment of a Power Line Communication system as in the invention.

FIG. 2 shows another possible implementation of a PLC system (1). In the wiring harness of an automotive supply system signals VS (supply voltage) and GND (ground) are routed through the complete vehicle, thereby supplying a lot of subcomponents. For a car the supply voltage level is typically in the range of 9V to 18V. The majority of components in the car must work in this range. In some applications the range can be extended from 4.5V . . . 40V. In a majority of cases the supply voltage is in the range of 12 to 14V.

For example in interior lighting applications LEDs are used as a light source and are placed in very small lighting nodes. The various lighting nodes are node 1 to node n of a PLC system as in FIG. 2, with each node acting as a driver for one or more LEDs.

Such small nodes cannot dissipate much power, so that the power supply of such nodes must be converted from a VS/GND potential of e.g. 12 to 40V to a S+/S− potential of e.g. 5V or 12V. A DC/DC converter (15) can be used to provide such a voltage conversion function. The DC/DC converter provides a stabilized supply of the voltages at terminals S+ and S− to all the nodes 1 . . . n. All components supplied via terminals S+ and S− may be seen as one subsystem, whereas all components supplied by VS and GND are part of a higher level system. In other words, the DC/DC converter separates components away from a higher level system to a separate subsystem as the voltage domains VS/GND and S+/S− are different. In another embodiment GND and S− might form one common ground line (not shown in FIG. 2). However, also in this embodiment VS and S+ are different. Therefore it can also be seen that the supply of that subsystem is decoupled from the main harness for the components of the system.

Common communication bus systems as for instance CAN, LIN and Ethernet data buses, transport information inside a vehicle to components of the higher level system and subsystems in data frames. Such information is usually provided from Electronic Control Units (ECUs) of a system. The physical bus wires, e.g. DH (D high) and DL (D low), carry that information and are routed from the higher level system to e.g. one or more subsystems. DH and DL can be any bus lines as e.g. CANH and CANL for a CAN bus implementation. In other embodiments only a single bus line e.g. DH is present, which in e.g. a LIN bus communication might be the common LIN bus pin. It is understood that to DH and DL any bus signal (single wire or differential wire) can be connected.

A node 1 (see FIG. 2) of such a subsystem comprises in one embodiment a physical layer PL, which is connected to the wires e.g. DH and DL of such a data bus. The physical layer is then further connected to a data processing device, which is able to process the received CAN, LIN or Ethernet data frames.

As already said, the node 1 of FIG. 2 can also provide and receive information via a transceiver to/from the shared power and data lines. Node 1 acts therefore as a gateway for CAN, LIN or Ethernet data frames. All other nodes of the sub system are able to process these data frames.

A LIN bus has only one data line that is received by the physical layer (PL). If LIN frames are provided to the two communication lines, the signal then is as of a differential means, which is of advantage, if LIN frames are processed in this subsystem.

Now the transmitter device (10) of the present invention is described more in detail. The transmitter device is in a typical embodiment part of a network node (4) as illustrated already in FIGS. 1 and 2. The transmitter device is connected directly between the power supply rails (5a, 5b). The operation of the transmitter device is based on the injection of predefined charges into the power supply lines. This is realized by providing in the transmitter device a circuit, below referred to as a switched capacitor circuit, comprising one or more capacitors and a plurality of switches, as detailed below.

Figure 3:
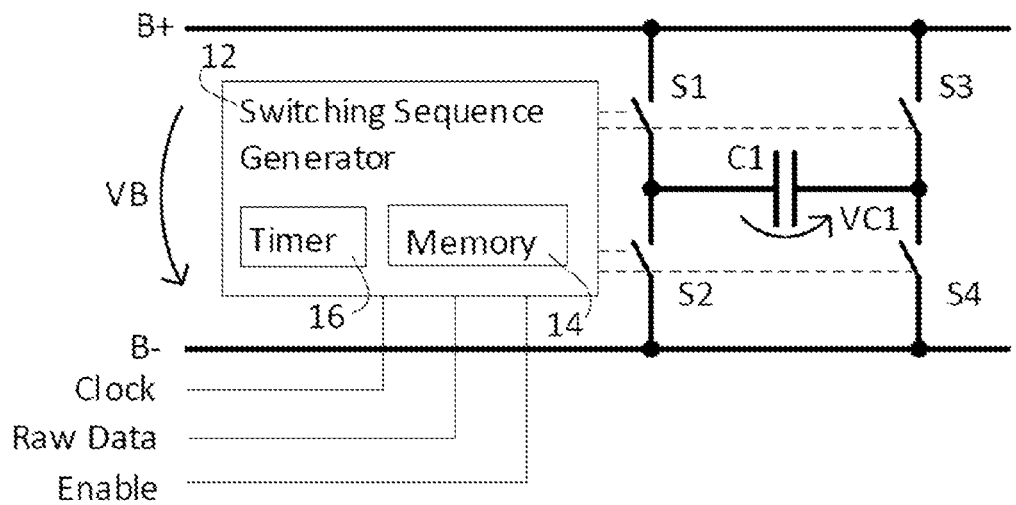
FIG. 3 illustrates an embodiment of a circuit with a capacitor and a plurality of switches comprised in the transmitter device of the invention.
Figure 4:
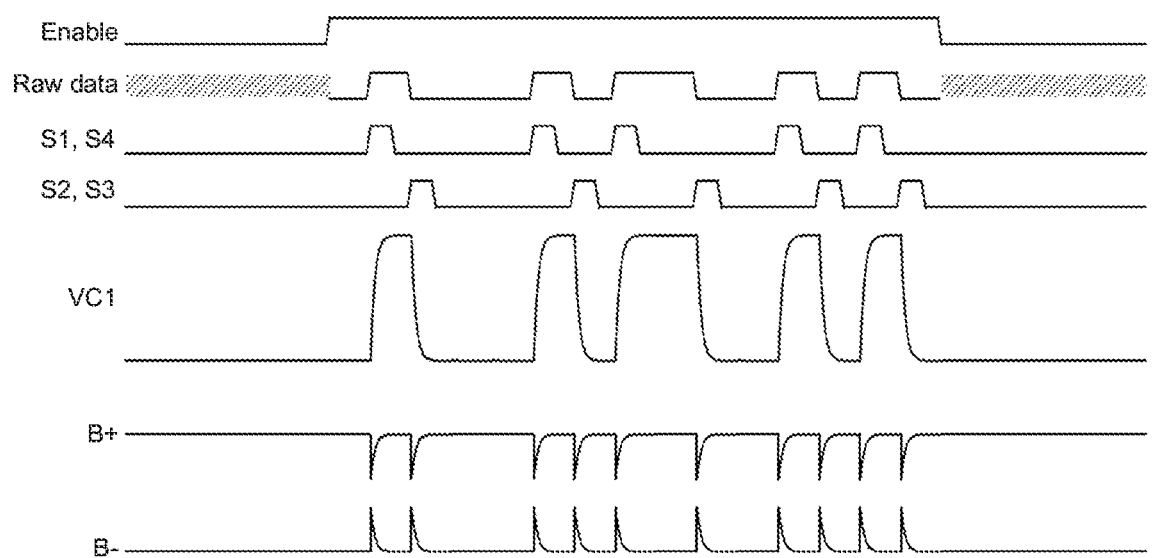
FIG. 4 illustrates waveforms observed when using the scheme of FIG. 3.

A first embodiment of the transmitter device is illustrated in FIG. 3. The switched capacitor circuit comprises a capacitor C1 and four controllable switches S1, S2, S3, S4 forming a H-bridge circuit between a positive supply line at a voltage B+ and a negative supply line at voltage B−. The capacitor C1 is connected between the two halves, i.e. the two legs, of the H-bridge. The transmitter further comprises a switching sequence generator (12) which receives the raw data bit stream which is to be transmitted over the DC power distribution lines and generates based on that raw data bit stream a switching sequence as illustrated in FIG. 4.

In an open state, i.e. with all four switches S1, S2, S3, S4 open, capacitor C1 is not connected to the bus. Charges present on the capacitor are preserved.

It is now supposed that capacitor C1 is being charged at start-up or otherwise has a sufficient amount of charge stored on its plates from the previous transmission. Then, if C1 is so charged that the voltage over C1 is −VB (the charge of C1 is negative), C1 gets recharged to a positive voltage by closing S1 and S4. This state is here referred to as 'charge1-4'. This recharging occurs at the first edge of the raw data to be sent while the transmitter is enabled. The raw data signal to be sent is fed via the switching sequence generator. The raw data signal is a bit stream, wherein, for example, a high state corresponds to a logical one and a low state to a logical zero. This switching sequence generator also receives the enable signal indicating when transmission is possible and steers the operation of switched capacitor circuit. At the next edge of the raw data the charge is inverted (reversed) again to a negative charge, so building up a negative voltage over C1, by closing S2 and S3. This state is referred to as charge2-3'. In this way the capacitor C1 is then recharged, but this time with a negative charge.

To ensure that at every edge of the raw data signal the charge in capacitor C1 is recharged correctly, the transmitter comprises in preferred embodiments a memory (14). This memory may be a part of the switching sequence generator (12) as in the embodiment shown in FIG. 3. The memory may in a basic implementation for example be a D-Flip-Flop, which stores the previous charge state information (hence, either state charge1-4 or charge2-3). Note that this storing can be performed independently of whether the last valid edge of the raw data occurred at the previous transmission (i.e. during the previous phase wherein the transmitter was enabled) or in the current transmission (meaning that the transmitter was not disabled since then).

The duration of the states charge1-4 and charge2-3 can be shorter than the duration of the high state or low state of the raw data signal. The switching sequence generator comprises a timer (16) that can set the duration. In a typical implementation the capacitor C1 is connected to the power supply line until the charge on the capacitor has reached its current steady state. This time bounded charging state ensures the capacitor does not lower the resonance frequency of the cable for long sequences of consecutive zeros or ones of the raw data signal, which could otherwise support parasitic oscillations. The switching sequence generator is fed with a clock signal.

The waveforms encountered during operation of the switched capacitor circuit are shown in FIG. 4. The enable signal is in the case depicted in FIG. 4 set high to enable the transmitter device. Raw data is the data stream provided to the transmitter. The control signals for the various switches S1, S2, S3, S4 are in the figure denoted with the name of the respective switch, VC1 is the voltage over the capacitor and VB of FIG. 3 is the voltage between the positive and negative supply lines carrying voltages B+ and B−, respectively.

At every edge of a valid raw data signal (i.e. a raw data signal to be transmitted while the enable signal is switched on), the charge on C1 is reversed. This results in displacement currents of short duration flowing through the bus lines. Because of the equivalent impedance provided to the network node at frequencies equal to or above the data rate, a voltage drop on the bus lines occurs. This voltage drop is exploited to carry the communication. In the example of a CAN bus the equivalent impedance is for example 60 Ohm, if both ends are terminated with 120 Ohm in order to match the characteristic impedance of a twisted pair line, so that reflections are prevented.

Since the current flow through the bus lines has the same magnitude but opposite sign, electromagnetic radiation is low, as the voltages behave in a strongly symmetric way. Also the other embodiments of the transmitter device according to the invention have this characteristic.

Because of the strong symmetry with equal but opposite voltage levels, the PLC system wherein the power distribution lines are applied, forms a differential network. Differential networks are known to be robust against electromagnetic disturbances, which is also an advantage of the embodiments of the transmitter device of this invention.

It is to be noted that both the low electromagnetic emissions and the robustness against electromagnetic disturbances are substantial advantages in an automotive environment.

The pair of switches S1 and S2 as well as the switches S3 and S4 are driven by the sequence generator in a non-overlapping way in order to enable the symmetric behaviour of the voltages B+ and B− on the supply lines. However, due to the data dependent voltage drops over the bus lines, the mean value of the bus signal level can be lower than the nominally applied DC level.

Figure 5:
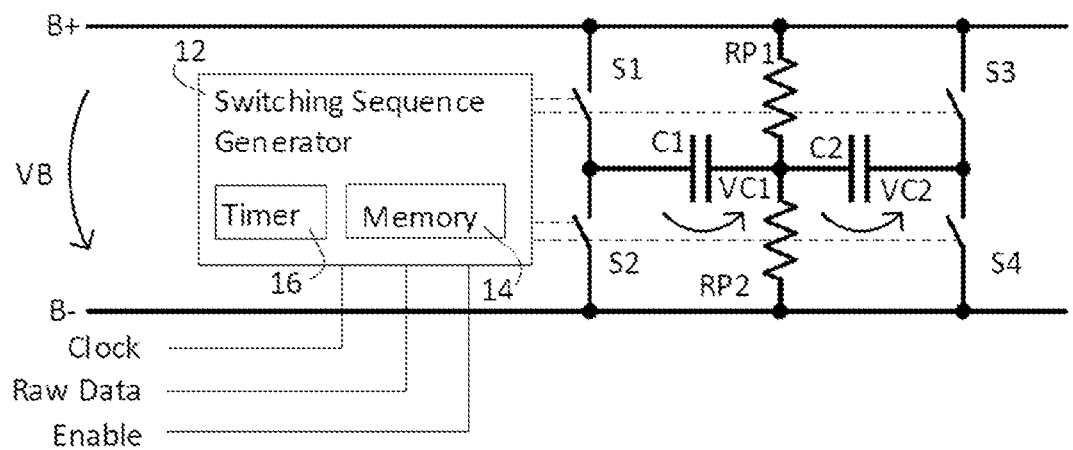
FIG. 5 illustrates another embodiment of a circuit with capacitors and a plurality of switches comprised in the transmitter device of the invention.

Another embodiment of a switched capacitor circuit of the transmitter device is shown in FIG. 5. The same principles of operation as in the scheme of FIG. 3 are adopted herein. Again an H-bridge like structure is implemented. Instead of using a single capacitor C1, a second capacitor C2 in series with C1 is now inserted. C1 and C2 preferably have a same capacitance. Between the capacitor nodes a high resistive divider Rp1 and Rp2 can be placed to form a virtual ground in the interconnection point between Rp1, Rp2, C1 and C2. The switching sequence generator is as in the embodiment of FIG. 5.

The circuit of FIG. 5 offers the advantage that the voltage swing across the two capacitors is equally distributed between C1 and C2 (assuming they have the same capacitance) so that the necessary voltage rating (i.e. the maximum voltage over one capacitor) is halved. This may be beneficial for integrated capacitors as encountered in modern semiconductor processes, wherein capacitors have a given maximum allowed voltage rating of e.g. 6V, 12V or 24V. This is advantageous if a maximum voltage supply of e.g. 40V is specified.

Figure 6:
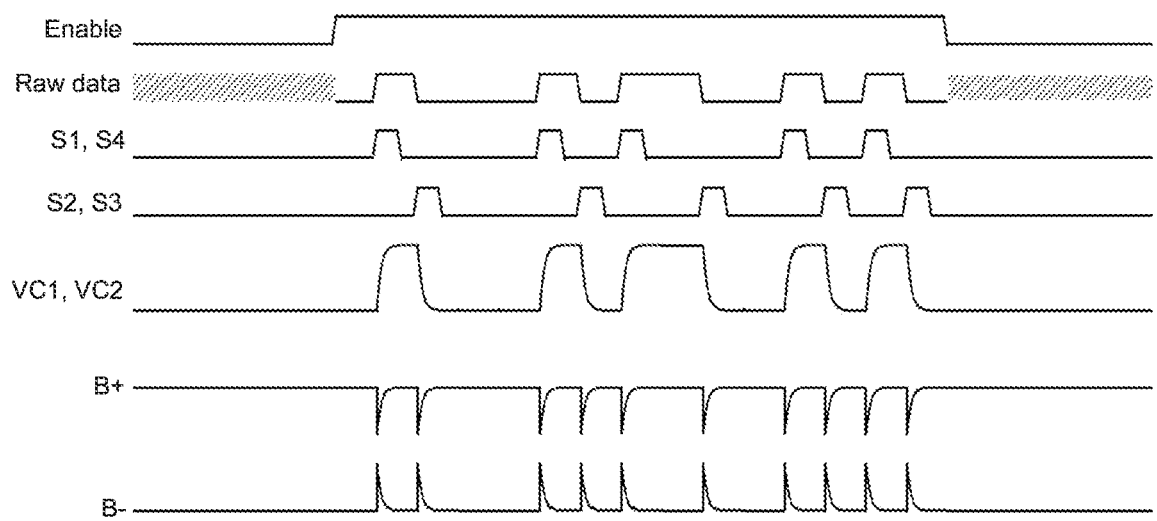
FIG. 6 illustrates waveforms observed when using the scheme of FIG. 5.

FIG. 6 illustrates the waveforms that occur in the scheme of FIG. 5. Again the enable signal is set high to enable the transmitter. Raw data is the data stream provided to the transmitter. The control signals for the various switches S1, S2, S3, S4 are denoted with the name of the respective switch, VC1 and VC2 denote the voltage over the capacitors C1 and C2 and B+ and B− the voltages of the positive and negative supply lines.

Figure 7:
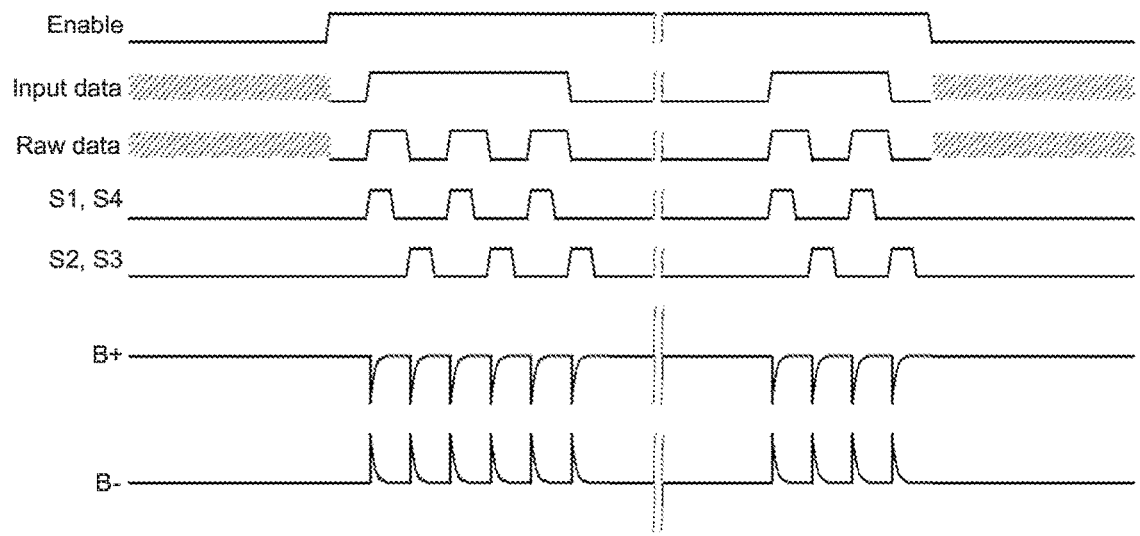
FIG. 7 illustrates waveforms similar to FIG. 6, but wherein a 'Mark' and 'Space' encoding has been applied.

As shown in the FIG. 6 the applied data signal on the bus does not distinguish between rising and falling edges. For that reason the data information needs to be encoded to 1-bit raw data as known in the art. For example, a 'Mark' and 'Space' encoding scheme can be used, wherein during 'Mark' a repetitive 0-1 sequence is used and during 'Space' the raw data level remains unchanged. In case of the CAN protocol 'Mark' corresponds to the dominant bus level and 'Space' to the recessive level, respectively. This particular example is shown in FIG. 7. The input data is the data information to be broadcasted. The raw data represents an encoded version of the input data and forms the data to be used for transmission.

Figure 8:
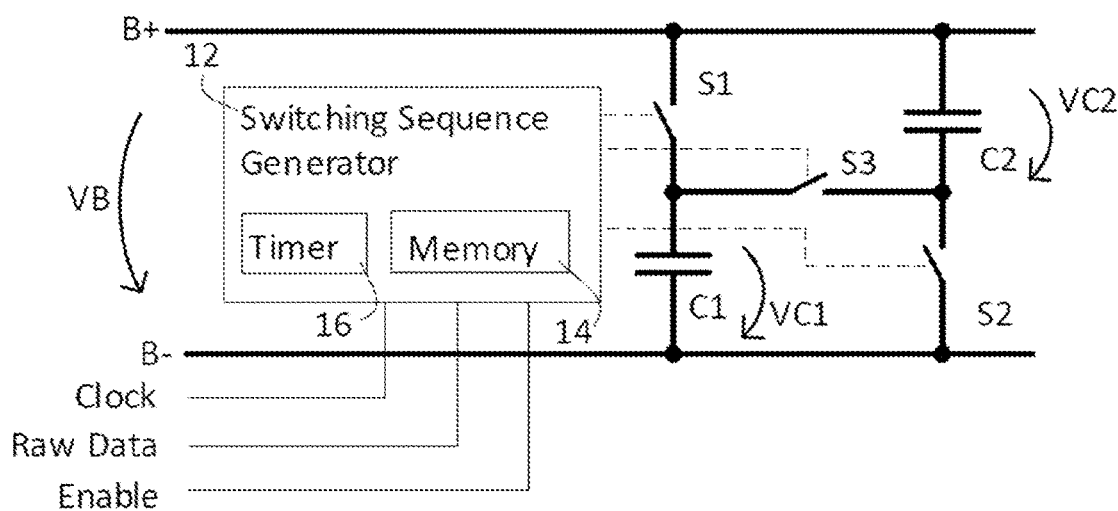
FIG. 8 illustrates a further embodiment of a circuit with capacitors and a plurality of switches comprised in the transmitter device of the invention.

FIG. 8 illustrates another embodiment of the switched capacitor circuit of the transmitter device of the invention. The switched capacitor circuit now comprises three switches S1, S2, S3 and two capacitors C1, C2. A first capacitor C1 is connected to the negative power supply line carrying B− and can be connected to the positive supply line at voltage B+ via a first controllable switch S1. A second capacitor C2 is connected to the positive supply line and can be connected to the negative supply line via a second controllable switch S2. Furthermore, the first and second capacitor can be interconnected by means of a third controllable switch S3. The circuit is shown in FIG. 8.

The switched capacitor circuit of FIG. 8 has three possible states. When all three switches are open, the capacitors C1 and C2 are not connected to the bus. The charges on the capacitors are preserved. The state wherein S1 and S2 are closed and S3 is open is referred to as the 'charge' state. Both C1 and C2 are then charged to the bus voltage VB. C1 and C2 are then connected in parallel to the various network nodes. The third state is referred to as the 'discharge' state, which occurs when switch S3 is closed while S1 and S2 are open. C1 and C2 are then each discharged to half the bus voltage level.

The capacitors C1 and C2 are charged at the start-up or have sufficient charge stored from the previous transmission. To ensure that, the sequence generator that drives the circuit may have an initial state wherein a preconditioning is performed to charge the capacitors to an appropriate level. For example, in case the transmission starts with a logical '0', the circuit may ensure precharging the capacitors to the '0-1' transition to successfully apply the first edge of the raw data to the supply lines. This can be accomplished by a charging outside the normal transmission (i.e. before or after the normal transmissions) by connecting the capacitors with a low conductive path in parallel to the switches (not shown) to the appropriate supply line. This leads to a higher time constant which will not corrupt the transients for communication sent by other (adjacent) nodes.

At the first rising edge of the raw data signal to be sent and with the transmitter being enabled, the capacitors are connected in series by closing switch S3 (state='discharge'). This means that, as there was a voltage equal to the bus voltage over each of C1 and C2, the resulting voltage level over the series connected capacitors is then equal to twice the bus voltage level. Since both ends are connected to the bus, a displacement current is flowing until the series connected capacitors have reached the bus level voltage, i.e. half of the bus voltage level over each capacitor. This displacement currents are flowing through the power lines. Because of the line impedance at frequencies equal to or above the data rate, this results in a voltage peak on the bus lines. S3 remains closed until the discharging is accomplished, but opens before the next edge of the raw data signal.

Figure 9:
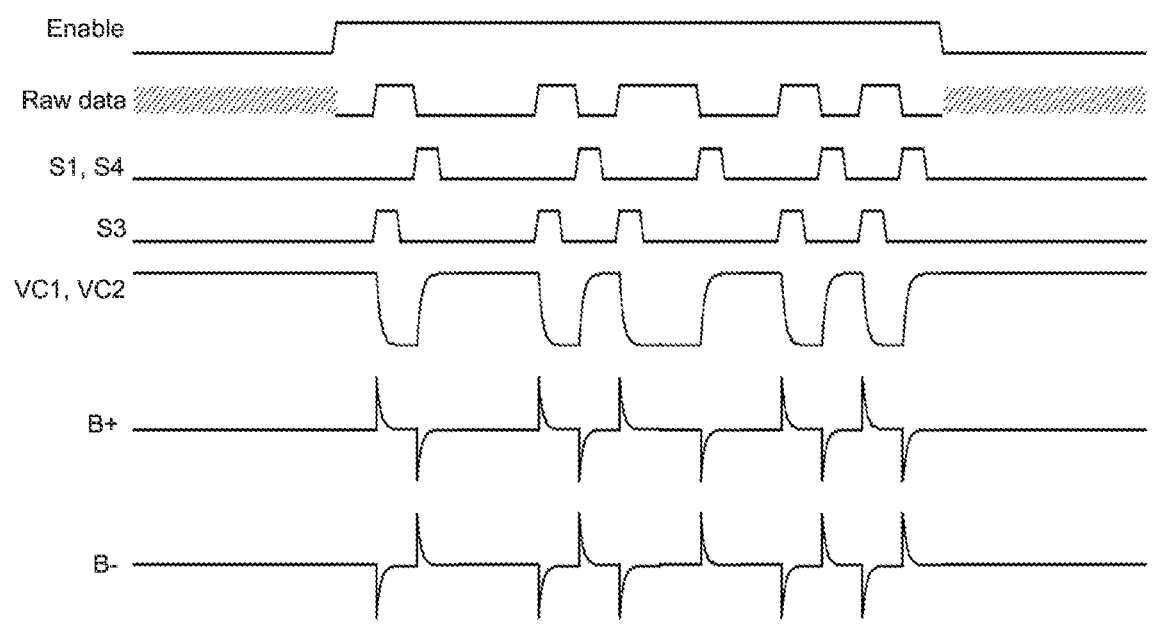
FIG. 9 illustrates waveforms observed when using the scheme of FIG. 8.

At the following edge of the raw data signal (hence, a falling edge) switches S1 and S2 are closed to connect C1 and C2 between the bus lines in order to charge (re-charge) C1 and C2 to the bus voltage level (state='charge'). Similar to the implementations discussed above, this results in short duration displacement currents flowing through the bus lines. Because of the line impedance at frequencies equal to or above the data rate, this yields a voltage drop on the bus lines. FIG. 9 illustrates the waveforms encountered when using this embodiment of the switched capacitor circuit in the transmitter device.

The enable signal depicted in FIG. 9 is set high to enable the transmitter device. Raw data is the data signal (i.e. the raw data bit stream) provided to the transmitter. The control signals for the various switches S1, S2, S3 are denoted with the name of the respective switch, VC1 and VC2 denote the voltages over the capacitors C1 and C2 and B+ and B− the voltages of the positive and negative supply lines.

The applied data signal causes rising and falling edges on the bus. For that reason a 1-bit data information can be directly applied as raw data to the transmitter. Further improvements in terms of bit error rate can be obtained by encoding the data information, for example by means of code spreading techniques as known in the art.

The duration of charge and discharge state can be shorter than the duration of the high or low state of the raw data signal. These durations can be set by the switching sequence generator, which is provided with a timer (16). In a typical implementation the capacitors are connected to the power supply line until the charges of the capacitors have reached their current steady state. This time bounded charging state ensures that the capacitors are not lowering the resonant frequency of the cable for long sequences of consecutive zeros or ones of the raw data signal, which could otherwise support parasitic oscillations. The switching sequence generator is fed with a clock signal which is used as a timing reference.

Since the current flow through the power supply lines is equal in magnitude but with opposite sign, the waveform is strongly symmetric and a low electromagnetic radiation is achieved, just as already described previously. Another key advantage is that the power consumption in the embodiment of FIG. 8 is lower than in the embodiments of FIG. 1 and FIG. 2. Without taking into account the current consumption for driving the switches, the equivalent series resistance of the capacitors and switch resistances, the average power consumption is theoretically zero for the same number of rising and falling edges of a raw data signal. Also, the mean bus voltage level remains equal to the applied DC supply voltage level in this case, which is advantageous for receivers, as they might operate with fixed threshold levels in order to determine the data.

An advantage of the transmitter device of this invention is that the in-coupling of the communication signals to the power line is achieved using capacitors only. Inductors are not needed. Another advantage is that the frequency of the data signals is equal to the frequency of the signals on the power line, hence there is no need for any modulation to an additional high frequency carrier. All this yields a cost advantage. As already mentioned earlier, also high bit rates as e.g. needed for a CAN communication, can be achieved.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A transmitter device for transmission of data via DC (direct current) power distribution lines, said transmitter device comprising:
   a sequence generator arranged for receiving a raw data bit stream to be transmitted over a positive and a negative DC power distribution line and for deriving a switching sequence based on said raw data bit stream,
   a circuit comprising one or more capacitors and a plurality of switches controllable with said switching sequence generated in said sequence generator, said one or more capacitors being connectable to said positive and negative DC power distribution lines via said plurality of switches,
   wherein said circuit is arranged for injecting in said positive and negative DC power distribution lines symmetric displacement currents resulting from displacing charges on said one or more capacitors when said one or more capacitors are charged or discharged according to the sequence of switching, said symmetric displacement currents causing changes in voltage of a same magnitude and opposite polarity on said positive and negative DC power distribution lines, said voltage having a same frequency as said raw data bit stream.

2. The transmitter device as in claim 1, wherein said switches form an H-bridge with one capacitor connecting the two legs of the H-bridge.

3. The transmitter device as in claim 1, wherein said switches form an H-bridge whereby, between the two legs of the H-bridge, an in series connection of two capacitors is realized having an interconnection point connected to a resistive divider forming a virtual ground in said interconnection point.

4. The transmitter device as in claim 1, wherein said circuit forms a H-bridge wherein the connection between the two legs of said H-bridge comprises a switch of said plurality of switches and wherein each leg of said H-bridge comprises a further switch of said plurality and a capacitor of said one or more capacitors.

5. The transmitter device as in claim 1, wherein said sequence generator is arranged to receive an enable signal to enable transmission by said transmitter device.

6. The transmitter device as in claim 1, wherein said sequence generator comprises a memory to store charging state information corresponding to the sequence of switching.

7. The transmitter device as in claim 1, wherein said sequence generator comprises a timer arranged to send timing signals to open or close one or more switches of said plurality of switches.

8. The transmitter device as in claim 1, wherein said switching sequence is adapted to perform a preconditioning of charge stored on at least one of said one or more capacitors.

9. The transmitter device as in claim 1, wherein said switching sequence is adapted to perform a precharging cycle of at least one of said one or more capacitors before transmission is started.

10. The transmitter device as in claim 1, comprising a receiver block arranged to receive data, so that the transmitter device also has receiver functionality.

11. The transmitter device as in claim 1 implemented in a vehicle.

12. A system for transmission of data, comprising:
   a positive and a negative DC (direct current) power distribution line,
   a power supply feed connected to said positive and negative DC power distribution lines,
   a termination impedance,
   one or more network nodes connected to said positive and negative DC power distribution lines, each network node comprising a transmitter device, said transmitter device including
      a sequence generator arranged for receiving a raw data bit stream to be transmitted over said positive and negative DC power distribution lines and for deriving a switching sequence based on said raw data bit stream,
      a circuit comprising one or more capacitors and a plurality of switches controllable with said switching sequence generated in said sequence generator, said one or more capacitors being connectable to said positive and negative DC power distribution lines via said plurality of switches,
      wherein said circuit is arranged for injecting in said positive and negative DC power distribution lines symmetric displacement currents resulting from displacing charges on said one or more capacitors when said one or more capacitors are charged or discharged according to the sequence of switching, said symmetric displacement currents causing changes in voltage of a same magnitude and opposite polarity on said positive and negative DC power distribution lines, said voltage having a same frequency as said raw data bit stream.

13. The system as in claim 12, wherein data to be transmitted via said transmitter device comprises one or more CAN (Controller Area Network) or LIN (Local Interconnect Network) or Ethernet data frames.

* * * * *